(12) United States Patent
Vasavi et al.

(10) Patent No.: US 8,924,667 B2
(45) Date of Patent: Dec. 30, 2014

(54) BACKUP STORAGE MANAGEMENT

(75) Inventors: Sagi Vasavi, Karnataka (IN);
Rajashekar Dasari, Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 13/251,661

(22) Filed: Oct. 3, 2011

(65) Prior Publication Data
US 2013/0086341 A1 Apr. 4, 2013

(51) Int. Cl.
*G06F 12/00* (2006.01)
*G06F 3/06* (2006.01)
*G06F 11/34* (2006.01)
*G06F 11/14* (2006.01)

(52) U.S. Cl.
CPC ........ *G06F 11/1458* (2013.01); *G06F 11/1461* (2013.01); *G06F 2201/81* (2013.01); *G06F 2201/815* (2013.01); *G06F 11/3409* (2013.01)
USPC .......................................... 711/162; 711/161

(58) Field of Classification Search
CPC ............ G06F 12/0246; G06F 12/0253; G06F 17/30312; G06F 11/1068; G06F 11/1451; G06F 9/3861; G06F 9/44589; G06F 9/45554; G06F 9/5066; G06F 12/0866; G06F 17/00; G06F 17/20; G06F 17/30067; G06F 17/30091
See application file for complete search history.

(56) References Cited

U.S. PATENT DOCUMENTS 7,293,140 B2    11/2007   Kano
7,475,277 B1 *  1/2009    Holdman et al. ............ 714/5.11
8,156,306 B1 *  4/2012    Raizen et al. ................ 711/202
8,260,744 B1 *  9/2012    Chatterjee et al. ............ 707/639

(Continued)

FOREIGN PATENT DOCUMENTS

JP    2006260392    9/2006
WO    WO2011064003    6/2011

OTHER PUBLICATIONS

Unknown., "Gresham Enterprise Storage Brings Unprecedented Visibility to Data Protection with Clareti VTL Version 2.0", Retrieved from http://www.managingautomation.com/maonline/news/product/read/Gresham_Enterprise_Storage_Brings_Unprecedented_Visibility_to_Data_Protection_with_Clareti_VTL_Version_2_0_28623, Published: May 1, 2007, 3 pages.

(Continued)

*Primary Examiner* — Yaima Rigol
*Assistant Examiner* — Mohamed Gebril
(74) *Attorney, Agent, or Firm* — Brooks, Cameron & Huebsch, PLLC; Edward J. Brooks, III

(57) ABSTRACT

Methods, systems, and computer-readable media with executable instructions stored thereon for backup storage management are provided. A utilization threshold can be defined for each of a number of virtual tape libraries (VTLs). A number of slipped backup jobs can be identified, wherein each of the number of slipped backup jobs is associated with one of the number of VTLs. A number of storage statistics for each of the number of VTLs can be collected and storage can be allocated for each of the number of slipped backup jobs via a VTL backup storage manager that analyzes the utilization threshold, the number of slipped backup jobs, and the number of storage statistics for each of the number of VTLs.

13 Claims, 3 Drawing Sheets

(56) References Cited

U.S. PATENT DOCUMENTS

| | | | |
|---|---|---|---|
| 2006/0101204 A1 | 5/2006 | Bao | |
| 2009/0282203 A1 | 11/2009 | Haustein et al. | |
| 2011/0066799 A1* | 3/2011 | Gold | 711/111 |
| 2011/0185117 A1* | 7/2011 | Beeston et al. | 711/111 |
| 2012/0096306 A1* | 4/2012 | Akirav et al. | 714/6.2 |
| 2012/0239878 A1* | 9/2012 | Beeston et al. | 711/113 |
| 2012/0239974 A1* | 9/2012 | Akirav et al. | 714/15 |
| 2012/0307631 A1* | 12/2012 | Yang et al. | 370/230 |

OTHER PUBLICATIONS

Unknown., "HP StorageWorks 1000i Virtual Library System user guide," Retrieved from http://h20000.www2.hp.com/bizsupport/TechSupport/CoreRedirect.jsp?redirectReason=DocIndexPDF&prodSeriesId=1849325&targetPage=http%3A%2F%2Fbizsupport1.austin.hp.com%2Fbc%2Fdocs%2Fsupport%2FSupportManual%2Fc00626088%2Fc00626088.pdf, Published: May 2006, 118 pages.

* cited by examiner

US 8,924,667 B2

BACKUP STORAGE MANAGEMENT

BACKGROUND

Datacenter backup may be performed manually by a backup administrator. Backup administrators may encounter instances where backup storage is exhausted, which could result in a backup window slippage. Ensuring there is sufficient backup storage capacity to prevent a backup window slippage can be a challenging task for a backup administrator.

DETAILED DESCRIPTION

Figure 1:
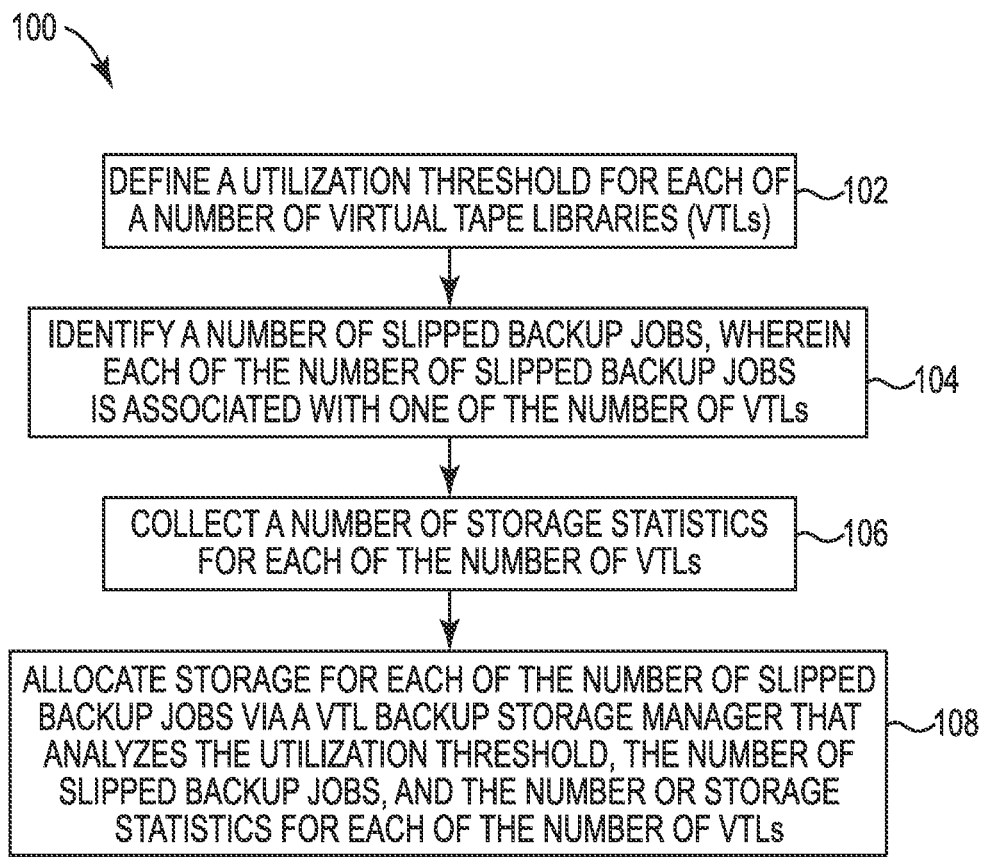
FIG. 1 is a flow chart illustrating an example of a method for backup storage management.

Examples of the present disclosure include methods, systems, and computer-readable media with executable instructions stored thereon for backup storage management. A utilization threshold can be defined for each of a number of virtual tape libraries (VTLs). A number of slipped backup jobs can be identified, wherein each of the number of slipped backup jobs is associated with one of the number of VTLs. A number of storage statistics for each of the number of VTLs can be collected and storage can be allocated for each of the number of slipped backup jobs via a VTL backup storage manager that analyzes the utilization threshold, the number of slipped backup jobs, and the number of storage statistics for each of the number of VTLs.

A datacenter backup can involve a number of backup storage devices. A datacenter is a facility used to house computer systems and associated components, such as server and storage systems. Datacenters can store a large amount of data and applications. A backup storage device can include a data storage virtualization technology such as, for example, a virtual tape library (VTL). Improper data backup that results in the backup job missing the backup window and loosing data can be costly. For example, a company may suffer adverse monetary effects, may have to replace equipment, lose productivity, and/or lose customers as a result of a failed backup. A failed backup can include a backup job slippage. A backup job slippage occurs when a backup job has not been successfully completed.

Datacenter backup can involve a number of backups running in parallel, which can make it difficult to track free backup storage. Typically backup administrators manually keep track of backup storage growth. A backup administrator tracking such a large number of backups can result in human error. Further, any action taken would be reactive as a tracked backup slippage must necessarily have already occurred. Such a retroactive approach does not limit the number of backup slippages that occur, but can merely limit the adverse effects of a backup slippage after it occurs.

Removing the monotonous task of tracking the multitude of backups can result in storage cost optimization. In a number of examples according to the present disclosure, an automatic backup storage management plan can be proactive by provisioning VTLs to the multitude of backups based on utilization threshold policies established by a backup administrator prior to commencing a backup. Such proactive examples provide the benefit of reducing the number of backup slippages and provide greater tracking capabilities of the utilization of the backup storage.

In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Similar elements or components between different figures can be identified by the use of similar digits. For example, 108 can reference element "08" in FIG. 1, and a similar element can be referenced as 208 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method 100 for backup storage management. In some examples, backup storage management can include automatic provisioning VTLs in a datacenter for the backup of data in the datacenter. At 102, a utilization threshold can be defined for each of a number of virtual tape libraries (VTLs). A utilization threshold can include a threshold percentage of free space that should be present in the VTL. The lower the utilization threshold percentage of a VTL the greater the importance a backup job associated with the VTL. In various examples, the utilization threshold of a VTL can vary depending on a service level agreement (SLA) and/or a criticality categorization of each backup job associated with the VTL. A criticality categorization can include consideration of the importance of a backup job to a related application. For example, if a backup job is crucial for an application to run, the backup job can receive criticality categorization of a mission critical application. Further, a mission critical application backup job can be associated with a lower utilization threshold, such as 75%. Additional criticality categorizations can include, but are not limited to, a moderately critical application and/or a less critical application.

A number of slipped backup jobs can be identified at 104, where each of the number of slipped backup jobs is associated with one of the number of VTLs. A slipped backup job is a backup job that is not completed due to some internal and/or external circumstance. In a number of examples, a backup job can slip due to a lack of storage space on the VTL. In another example, a backup job can slip due to an expired tag. An expired tag can include a set time and/or date for a backup that has since passed. Collecting the number of backup jobs can include generating a report of the backup jobs that slipped and/or the VTL associated with each slipped backup job.

At 106, a number of storage statistics are collected for each of the number of VTLs. In various examples, the number of storage statistics can include checking for a VTL utilization percentage, a reclaim space flag, and/or a VTL storage extensibility flag of each of the number of VTLs. A reclaim space flag can include an indicator within the VTL that indicates the VTL has space available to be reclaimed. A VTL storage extensibility flag can include an indicator within the VTL that the storage of the VTL can be extended. In some examples, collecting the number of storage statistics can include generating a report containing at least the number of storage statistics.

In a number of examples, storage statistics can be collected 106 according to an algorithm. For example, a VTL can be checked for expired virtual tapes on the virtual library system (VLS). If there are expired virtual tapes, a reclaim space of the VTL can be set to yes. If there are no expired virtual tapes on the VTL, the reclaim space can be set to no. Further, the VTL can be checked for available storage capacity in the VLS for expanding the storage space. If the VTL has available storage, a storage extensibility can be set to yes. If the VTL does not have available storage capacity the storage extensibility can be set to no.

Storage is allocated for each of the number of slipped backup jobs via a VTL backup storage manager that analyzes the utilization threshold, the number of slipped backup jobs, and the number of storage statistics for each of the number of VTLs, at 108. In a number of examples, allocating storage can include creating a new VTL, extending VTL storage, and/or reclaiming VTL storage, as discussed in connection with FIG. 2.

In some examples of the present disclosure, each of the number of slipped backup jobs can be rescheduled when the VTL corresponding to the each of the each of the number of slipped backup jobs exceeds the defined utilization threshold. That is, when a slipped backup job has been identified 104 and storage allocated for that slipped backup job 108, the slipped backup job can be rescheduled for backup. For example, the backup can be restarted and the rescheduled backup job can be performed successfully since the reason for the slippage was addressed by the storage allocation 108.

Figure 2:
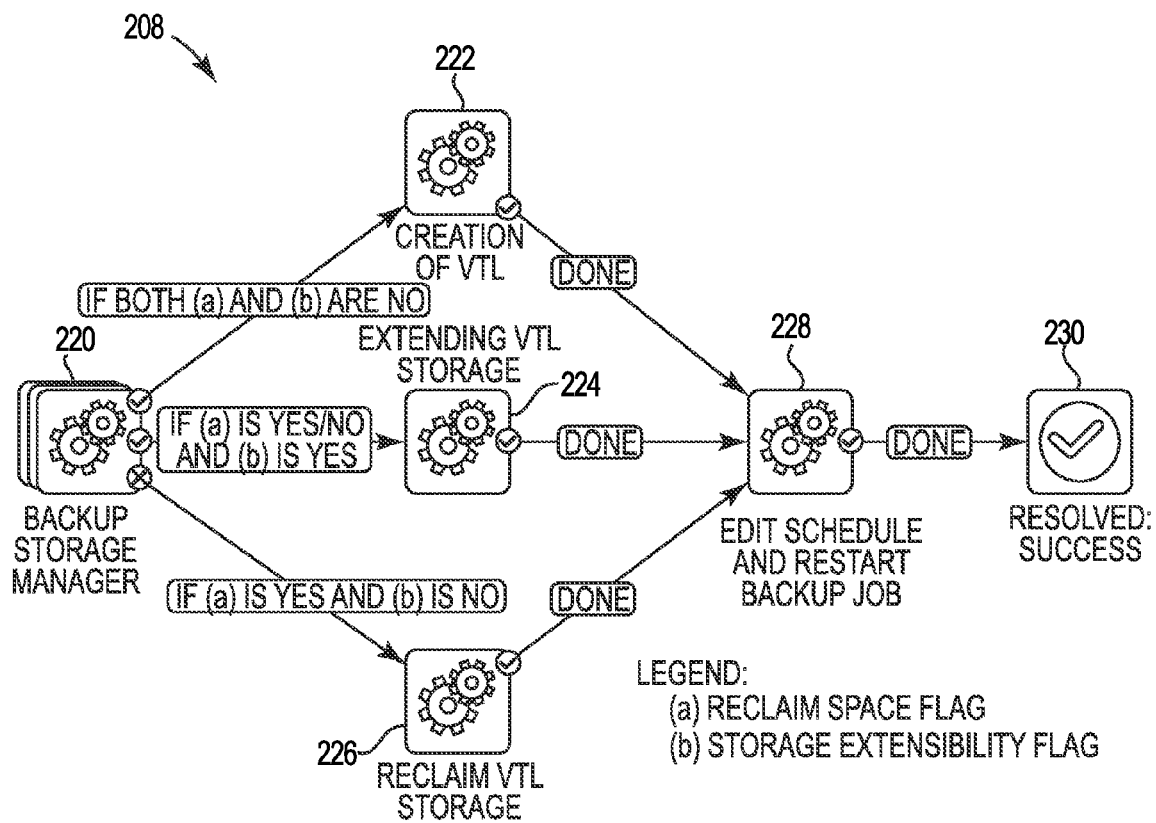
FIG. 2 is a flow chart illustrating an example of a method for allocating storage for each of the number of slipped backup jobs via a VTL backup storage manager.

FIG. 2 is a flow chart illustrating an example of a method 208 for allocating storage for each of the number of slipped backup jobs via a VTL backup storage manager. At 220, a backup storage manager analyzes the number of collected slipped backup jobs and the number of storage statistics of each VTL. In an example, the backup storage manager first analyzes each of the number of VTLs to determine if the utilization percentage of each VTL has been exceeded. If the utilization percentage has been exceed then the backup storage manager further analyzes the VTL to determine if the VTL has a reclaim space flag and/or a storage extensibility flag. A flag is some indicator in the VTL that the VTL has either reclaim space or extendable storage. As shown in FIG. 2, the analysis of whether a VTL has a reclaim space flag is identified as (a). Further, as shown in FIG. 2, the analysis of whether a VTL has a storage extensibility flag is identified as (b). Depending on the results of the backup storage manager's analysis, storage maybe allocated via creating a new VTL 222, extending VTL storage 224, and/or reclaiming VTL storage 226.

A new VTL can be created at 222 for at least one of the number of slipped backup jobs when the VTL corresponding to at least one of the number of slipped backup jobs exceeds the defined utilization threshold, does not have a reclaim space flag, and does not have a VTL storage extensibility flag. In various examples, creating the new VTL for the at least one of the number of slipped backup jobs can include assigning a new utilization threshold to the new VTL equal to the defined utilization threshold of the VTL corresponding to the at least one of the number of slipped backup jobs. Each new VTL can be defined as having an auto setting threshold and/or each of the number of VTLs can be defined as having a manual setting threshold. That is, each of the number of VTLs can have settings (e.g., utilization threshold) defined automatically or manually by a backup specialist. In various examples, each created new VTL can be defined such that the settings of the new VTL are automatically set the same as the settings of the associated VTL from which the new VTL is created from. For example, VTL 1 can have a manually defined setting threshold of 75% utilization capacity and a new VTL 4, created as a result of the analysis of VTL 1, can be automatically defined as having a utilization threshold of 75%. In an example, a manual setting threshold VTL can be a parent VTL and an automatic setting VTL can be a child VTL.

VTL storage of the VTL corresponding to at least one of the number of slipped backup jobs can be extended when the corresponding VTL exceeds the defined utilization threshold and has a VTL storage extensibility flag, at 224. In an example, the backup storage manager can allocate storage by extending the VTL storage regardless if the VTL has a reclaim space flag.

VTL storage of the VTL corresponding to the at least one of the number of slipped backup jobs can be reclaimed at 226 when the corresponding VTL exceeds the defined utilization threshold, has a reclaim space flag, and does not have a VTL storage extensibility flag.

At 228, each of the number of slipped backup jobs are rescheduled when the VTL corresponding to the each of the number of slipped backup jobs exceeds the defined utilization threshold. For example, the backup can be restarted after each of the number of slipped backup jobs are rescheduled. At 230, the backup can be complete.

For example, below are a number of exemplary backup jobs of a datacenter backup, the corresponding VTL of each backup job, and whether the back up job slipped due to storage issues:

TABLE 1

| Backup Jobs | | |
|---|---|---|
| Backup Jobs | VTL Name | Backup Slippage due Storage |
| J1 | VTL 2 | No |
| J2 | VTL 1 | Yes |
| J3 | VTL 1 | Yes |
| J4 | VTL 1 | No |
| J5 | VTL 1 | No |
| J6 | VTL 3 | No |
| J7 | VTL 2 | Yes |
| J8 | VTL 3 | Yes |
| J9 | VTL 2 | Yes |
| J10 | VTL 2 | Yes |

As discussed in connection with FIGS. 1 and 2, a utilization threshold is defined for each of the number of VTLs. For example, the backup jobs that belong to VTL 1 (e.g., J2, J3, J4, and J5) can be said to belong to a mission critical application. Accordingly, VTL 1 can be set at a utilization threshold of 75%. Backup jobs that belong to VTL 2 (e.g., J1, J7, J9, and J10) can be said to belong to a moderately critical application. Accordingly, VTL 2 can be set at a utilization threshold of 90%. The backup Jobs of VTL 3 (e.g., J6 and J8) can be said to belong to a less critical Application. Accordingly, VTL 3 can be set at a utilization threshold 95%. Further, as indicated above, the settings for VTL 1, VTL 2, and VTL 3 are manually defined and therefore can be defined as having a manual setting threshold. Table 2 summarizes the above paragraph:

TABLE 2

| | VTL Definition | |
|---|---|---|
| VTL Name | Threshold (% Capacity) | Setting Threshold (Auto/Manual) |
| VTL 1 | >75 | Manual |
| VTL 2 | >90 | Manual |
| VTL 3 | >95 | Manual |

Figure 3:
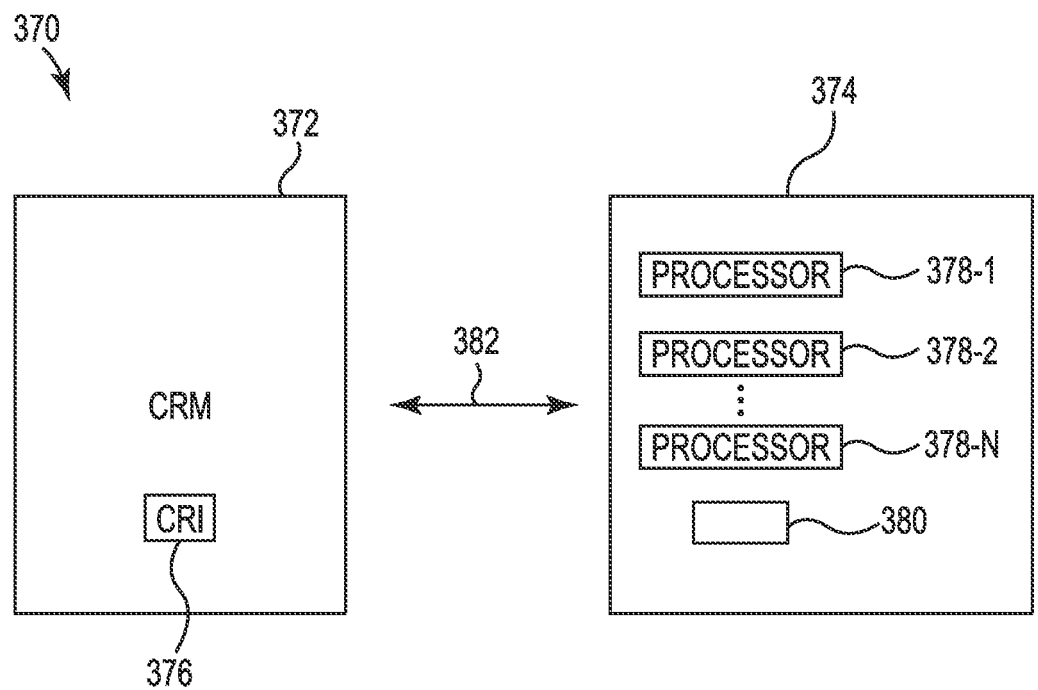
FIG. 3 illustrates a block diagram of an example of a computer-readable medium in communication with processing resources for backup storage management.

The number of slipped back up jobs due to lack of storage and the corresponding VTLs are collected and displayed in FIG. 3:

TABLE 3

| | Slipped Backup Jobs | |
|---|---|---|
| BackUp Jobs | VTL Name | Backup Slippage due Storage |
| J2 | VTL 1 | Yes |
| J3 | VTL 1 | Yes |
| J7 | VTL 2 | Yes |
| J8 | VTL 3 | Yes |
| J9 | VTL 2 | Yes |
| J10 | VTL 2 | Yes |

Storage statistics for each of the number of VTLs are collected and displayed in Table 4:

TABLE 4

| | VTL Storage Statistics | | |
|---|---|---|---|
| VTL Name | VTL Utilization (%) | Reclaim space | VTL Storage Extensible |
| VTL 1 | 60 | No | No |
| VTL 2 | 95 | No | Yes |
| VTL 3 | 75 | Yes | Yes |

Upon determining the VTLs that exceeded the threshold utilization limit, the analysis will check each VTL for:

(a) Reclaim space flag and
(b) Storage extensibility flag.

As discussed in connection with FIG. 2, there are three possible allocation cases:

Case 1: If both (a) and (b) are NO. Then, a new VTL will be created;

Case 2: if (a) is Yes/No and (b) is Yes. Then, VTL storage will be extended; and Case 3: If (a) is Yes and (b) is No. Then, VTL Storage will be reclaimed.

In the above example, VTL1 does not have a reclaim space flag or a storage extensibility flag. Therefore, as outlined in Case 1 and FIG. 2, 222, a new VTL, VLT4, will be created. VTL 4 is associated with VTL1, which leads to the settings and threshold limits of VTL1 to be replicated to VTL4. In the above example, backup jobs J2 and J3 will be assigned to new VTL 4 as described in Table 6 below. VTL1 can be defined as VTL4's parent, and all its values will be replicated to VTL4. That is, VTL 1 has a manual setting and VTL 4 has an automatic setting.

TABLE 5

| | Auto Configure Threshold Limits | | |
|---|---|---|---|
| VTL | Parent VTL | Threshold (% Capacity) | Setting Threshold* (Auto/Manual) |
| VTL 1 | VTL 1 | 75 | Manual |
| VTL 2 | VTL 2 | 90 | Manual |
| VTL 3 | VTL 3 | 95 | Manual |
| VTL 4 | VTL 1 | 75 | Auto |

TABLE 7

| | Creating New VTLs for Backup Jobs | |
|---|---|---|
| BackUp Jobs | VTL | New VTL |
| J2 | VTL 1 | VTL 4 |
| J3 | VTL 1 | VTL 4 |
| J7 | VTL 2 | — |
| J8 | VTL 3 | — |
| J9 | VTL 2 | — |
| J10 | VTL 2 | — |

In the above example, VTL 2 has a storage extensibility flag. Further, VTL 2 does not have a reclaim space flag as indicated. However, because VTL 2 does have a storage extensibility flag the lack of a reclaim space flag is not a factor in storage allocation. Therefore, VTL 2 will be extended as set forth by FIG. 2, 224. In the above example VTL3's reclaim space is Yes and storage extensibility is NO. As such, VTL 3 storage space will be reclaimed as described in connection with FIG. 2, 226.

FIG. 3 illustrates a block diagram 370 of an example of a computer-readable medium in communication with processing resources for backup storage management according to the present disclosure. Computer-readable medium (CRM) 372 can be in communication with a computing device 374 having processor resources of more or fewer than 378-1, 378-2, . . . , 378-N, that can be in communication with, and/or receive a tangible non-transitory CRM 372 storing a set of computer-readable instructions (CRI) 376 executable by one or more of the processor resources (e.g., 378-1, 378-2, . . . , 378-N) for backup storage management as described herein. The computing device 374 may include memory resources 380, and the processor resources 378-1, 378-2, . . . , 378-N may be coupled to the memory resources 380.

Processor resources can execute computer-readable instructions 376 for CMDB security are stored on an internal or external non-transitory computer-readable medium 372. A non-transitory computer-readable medium (e.g., computer readable medium 372), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of CRM.

The non-transitory computer-readable 372 medium can be integral, or communicatively coupled, to a computing device, in either in a wired or wireless manner. For example, the non-transitory CRM can be an internal memory, a portable memory, a portable disk, or a memory located internal to another computing resource (e.g., enabling the computer-readable instructions to be downloaded over the Internet).

The CRM 372 can be in communication with the processor resources (e.g., 378-1, 378-2, . . . , 378-N) via a communication path 382. The communication path 382 can be local or remote to a machine associated with the processor resources 378-1, 378-2, . . . , 378-N, Examples of a local communication path 382 can include an electronic bus internal to a machine such as a computer where the CRM 372 is one of volatile, non-volatile, fixed, and/or removable storage medium in communication with the processor resources (e.g., 378-1, 378-2, . . . , 378-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 382 can be such that the CRM 372 is remote from the processor resources (e.g., 378-1, 378-2, . . . , 378-N) such as in the example of a network connection between the CRM 372 and the processor resources (e.g., 378-1, 378-2, . . . , 378-N). That is, the communication path 382 can be a network connection. Examples of such a network connection can include a local area network (LAN), a wide area network (WAN), a personal area network (PAN), and the Internet, among others. In such examples, the CRM 372 may be associated with a first computing device and the processor resources (e.g., 378-1, 378-2, . . . , 378-N) may be associated with a second computing device.

Processor resources 378-1, 378-2, . . . , 378-N coupled to the memory 380 can initiate a backup of data in a datacenter, wherein the backup includes a number of backup jobs. A utilization threshold can be defined for each of a number of VTLs in the datacenter. Further, processor resources 378-1, 378-2, . . . , 378-N can identify a number of slipped backup jobs, wherein each of the number of slipped backup jobs corresponds to one of the number of VTLs. The number of slipped backup jobs includes a number of storage exhausted backup jobs and/or a number exhausted tag backup jobs. Processor resources 378-1, 378-2, . . . , 378-N can, for example, collect a number of storage statistics for each of the number of VTLs. The processor resources can, for example, further allocate storage for each of the number of slipped backup jobs via a VTL backup storage manager that analyzes the utilization threshold, the number of slipped backup jobs, and the number of storage statistics for each of the number of VTLs. Processor resources 378-1, 378-2, . . . , 378-N can reschedule the each of the number of slipped backup jobs when the VTL corresponding to the each of the each of the number of slipped backup jobs exceeds the defined utilization threshold.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The term "a number of" is meant to be understood as including at least one but not limited to one. The phrase "in an example," as used herein does not necessarily refer to the same example, although it can.

What is claimed is:

1. A method for backup storage management, comprising:
defining a utilization threshold for each of a number of virtual tape libraries (VTLs);
identifying a number of slipped backup jobs, wherein each of the number of slipped backup jobs is associated with one of the number of VTLs;
collecting a number of storage statistics for each of the number of VTLs, wherein collecting the number of storage statistics includes checking for a reclaim space flag and a VTL storage extensibility flag of each of the number of VTLs; and
allocating storage for each of the number of slipped backup jobs via a VTL backup storage manager that analyzes the utilization threshold, the number of slipped backup jobs, and the number of storage statistics for each of the number of VTLs,
wherein allocating the storage includes creating a new VTL for at least one of the number of slipped backup jobs when the VTL corresponding to at least one of the number of slipped backup jobs exceeds the defined utilization threshold, does not have a reclaim space flag, and does not have a VTL storage extensibility flag, and
wherein creating the new VTL for the at least one of the number of slipped backup jobs includes assigning a new utilization threshold to the new VTL equal to the defined utilization threshold of the VTL corresponding to the at least one of the number of slipped backup jobs.

2. The method of claim 1, wherein collecting the number of storage statistics includes checking for a VTL utilization percentage of each of the number of VTLs.

3. The method of claim 1, wherein allocating the storage includes extending VTL storage of the VTL corresponding to at least one of the number of slipped backup jobs when the corresponding VTL exceeds the defined utilization threshold and has a VTL storage extensibility flag.

4. The method of claim 1, wherein allocating the storage includes reclaiming VTL storage of the VTL corresponding to the at least one of the number of slipped backup jobs when the corresponding VTL exceeds the defined utilization threshold, has a reclaim space flag, and does not have a VTL storage extensibility flag.

5. The method of claim 1, wherein the method includes rescheduling a particular one of the number of slipped backup jobs when the VTL corresponding to the particular one of the each of the number of slipped backup jobs exceeds the defined utilization threshold.

6. A non-transitory computer-readable medium including computer-readable instructions stored thereon that, when executed by one or more processors, cause the one or more processors to:
- initiate a backup of data in a datacenter, wherein the backup includes a number of backup jobs;
- define a utilization threshold for each of a number of virtual tape libraries (VTLs) in the datacenter;
- identify a number of slipped backup jobs of the backup jobs, wherein each of the number of slipped backup jobs is associated with one of the number of VTLs;
- allocate storage for each of the number of slipped backup jobs via a VTL backup storage manager that analyzes the utilization threshold, the number of slipped backup jobs, and a number of storage statistics for each of the number of VTLs,
- wherein the number of storage statistics includes a check for a reclaim space flag and a VTL storage extensibility flag of each of the number of VTLs,
- wherein to allocate the storage includes creation of a new VTL for at least one of the number of slipped backup jobs when the VTL corresponding to at least one of the number of slipped backup jobs exceeds the defined utilization threshold, does not have a reclaim space flag, and does not have a VTL storage extensibility flag, and
- wherein creation of the new VTL for the at least one of the number of slipped backup jobs includes assignment of a new utilization threshold to the new VTL equal to the defined utilization threshold of the VTL corresponding to the at least one of the number of slipped backup jobs; and
- reschedule a particular one of the number of slipped backup jobs.

7. The non-transitory computer-readable medium of claim 6, wherein the utilization threshold for each of the number of VTLs includes a threshold percentage of free space present in the VTL.

8. The non-transitory computer-readable medium of claim 6, wherein the instructions to define a utilization threshold for each of the number of VTLs includes instructions to categorize each of the VTLs according to a mission criticality rating associated with a utilization threshold.

9. The non-transitory computer-readable medium of claim 6, wherein instructions to allocate the storage include instructions to:
- create a new VTL for at least one of the number of slipped backup jobs when the VTL corresponding to at least one of the number of slipped backup jobs exceeds the defined utilization threshold; and
- assign the at least one of the collected number of storage statistics of the VTL corresponding to the at least one of the number of slipped backup jobs that exceeds the defined utilization threshold to the new VTL.

10. The non-transitory computer-readable medium of claim 9, including instructions to:
- define each of the number of VTLs as having a manual setting threshold, including setting a newly defined utilization threshold; and
- define the new VTL as having an auto setting threshold, including setting an already defined utilization threshold.

11. A system for backup storage management, comprising:
- a processor coupled to a memory storing executable instructions, the processor configured to execute the instructions to:
  - initiate a backup of data in a datacenter, wherein the backup includes a number of backup jobs;
  - define a utilization threshold for each of a number of virtual tape libraries (VTLs) in the datacenter;
  - identify a number of slipped backup jobs of the backup jobs, wherein each of the number of slipped backup jobs is associated with one of the number of VTLs;
  - collect a number of storage statistics for each of the number of VTLs, wherein the collected number of storage statistics includes a check for a reclaim space flag and a VTL storage extensibility flag of each of the number of VTLs;
  - allocate storage for each of the number of slipped backup jobs via a VTL backup storage manager that analyzes the utilization threshold, the number of slipped backup jobs, and the number of storage statistics for each of the number of VTLs,
  - wherein to allocate the storage includes creation of a new VTL for at least one of the number of slipped backup jobs when the VTL corresponding to at least one of the number of slipped backup jobs exceeds the defined utilization threshold, does not have a reclaim space flag, and does not have a VTL storage extensibility flag, and
- wherein creation of the new VTL for the at least one of the number of slipped backup jobs includes assignment of a new utilization threshold to the new VTL equal to the defined utilization threshold of the VTL corresponding to the at least one of the number of slipped backup jobs; and
  - reschedule a particular one of the number of slipped backup jobs when the VTL corresponding to the particular one of the each of the number of slipped backup jobs exceeds the defined utilization threshold.

12. The system of claim 11, wherein at least one of the number of slipped backup jobs results from at least one of the number of VTLs associated with the at least one of the number of slipped backup jobs exceeding the defined utilization threshold.

13. The system of claim 11, wherein the utilization threshold is defined according to a Service Level Agreement.

* * * * *